(12) United States Patent
Chen et al.

(10) Patent No.: US 7,770,680 B2
(45) Date of Patent: Aug. 10, 2010

(54) HOOD MOUNT ASSEMBLY

(75) Inventors: Hsi-Yuan S. Chen, Kirkland, WA (US);
Timothy Michael Sullivan, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 126 days.

(21) Appl. No.: 11/967,927

(22) Filed: Dec. 31, 2007

(65) Prior Publication Data

US 2009/0167058 A1    Jul. 2, 2009

(51) Int. Cl.
*B62D 25/12* (2006.01)
(52) U.S. Cl. .................................. 180/69.2; 180/69.21
(58) Field of Classification Search ................ 180/69.2, 180/69.21, 69.22, 69.23
See application file for complete search history.

(56) References Cited

U.S. PATENT DOCUMENTS

| 3,225,856 | A | * | 12/1965 | Caramanna | ............... 180/69.21 |
|---|---|---|---|---|---|
| 3,754,614 | A | * | 8/1973 | Habas | ..................... 180/69.21 |
| 5,553,911 | A | | 9/1996 | Bodin | |
| 6,116,366 | A | | 9/2000 | Creswick | |
| 6,588,525 | B2 | * | 7/2003 | Brogly et al. | ............ 180/69.21 |
| 6,868,930 | B2 | * | 3/2005 | Brogly et al. | ............ 180/69.21 |
| 6,942,056 | B2 | * | 9/2005 | Nadeau et al. | .............. 180/274 |
| 6,991,055 | B2 | * | 1/2006 | White et al. | ............... 180/69.2 |
| 7,475,752 | B2 | * | 1/2009 | Borg et al. | ................... 180/274 |
| 2008/0156556 | A1 | * | 7/2008 | Takahashi | ................ 180/69.21 |
| 2009/0050388 | A1 | * | 2/2009 | Leong | ..................... 180/69.21 |
| 2009/0167058 | A1 | * | 7/2009 | Chen et al. | ............ 296/190.07 |

* cited by examiner

*Primary Examiner*—Jeffrey J Restifo
(74) *Attorney, Agent, or Firm*—Christensen O'Connor; Johnson Kindness PLLC

(57) ABSTRACT

A vehicle includes a chassis, a cab mounted to the chassis, and a hood positioned adjacent the cab. A hood mount assembly is disposed between the cab and the hood. The hood mount assembly allows the cab to slide in first and second directions relative to the hood and rotate in first and second directions relative to the hood.

14 Claims, 5 Drawing Sheets

HOOD MOUNT ASSEMBLY

BACKGROUND

Heavy-duty trucks typically include a chassis, an engine engaged on the chassis, a radiator and grill mounted on the chassis in front of the engine, a hood for enclosing the engine, and a cab mounted on the chassis. It is often desirous to have an air suspension system or other suitable system that allows the cab to move independently of the chassis to provide the driver and passengers with added comfort. More specifically, the cab normally moves fore and aft and up and down relative to the chassis in response to changing conditions on the road.

Depending on the type of hood used, the hood may be mounted at its forward end to either the radiator or the forward end of the chassis, and the hood may be mounted at its rear end to a portion of the cab. For instance, a butterfly hood, which consists of two or more panels hinged at the center to allow engine access, is typically fixedly mounted to the cab at its rear end and fixedly mounted to the radiator at its forward end. Fixed connections between the chassis and the cab (through the hood) prevent the fore and aft cab movement and the up and down cab movement required of the cab suspension system. Thus, it is desirous to have a hood mounting system that secures the hood to the cab in a manner that accommodates the movement of the cab relative to the hood and chassis.

SUMMARY

The present disclosure provides a vehicle having a chassis, a cab mounted to the chassis, and a hood positioned adjacent the cab. A hood mount assembly is disposed between the cab and the hood. The hood mount assembly allows the cab to slide in first and second directions relative to the hood and rotate in first and second directions relative to the hood.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
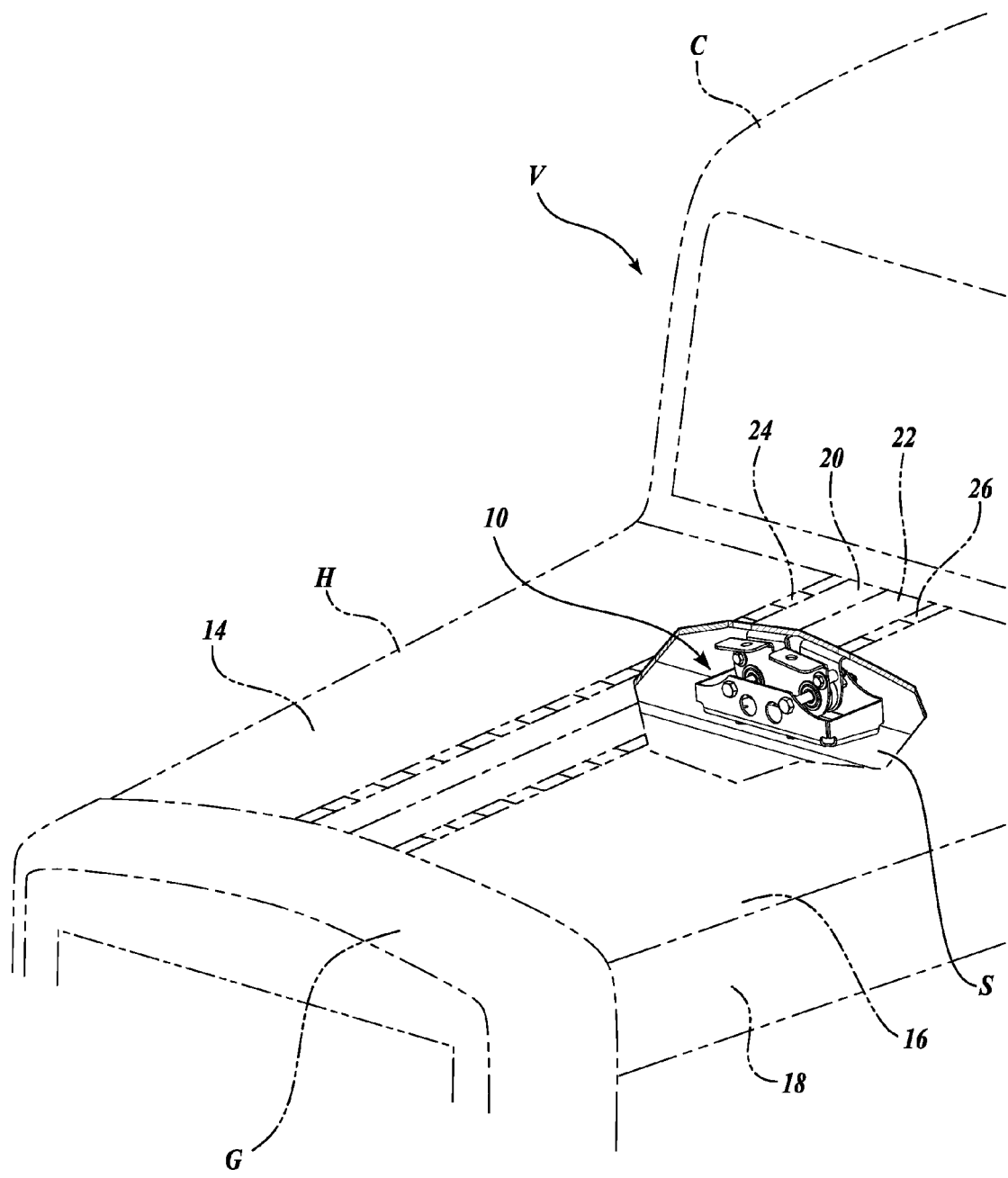
FIG. 1 is an environment view of a representative embodiment of a rear hood mount shown coupling a hood to a portion of a vehicle.

A hood mount assembly 10 constructed in accordance with one embodiment of the present disclosure is best seen by referring to FIG. 1. The hood mount assembly 10 is shown in use with a vehicle V having a chassis (not shown), a cab C mounted to the chassis, a hood H positioned adjacent the cab C, and a grill assembly G positioned adjacent the hood H and mounted to the chassis. The hood mount assembly 10 is used to adjustably mount the hood H to the cab C at the rearward portion of the hood H. It should be appreciated that any preferred hood and cab design may be used; and, therefore, the hood H and cab C shown in FIG. 1 should be seen as illustrative only and should not be taken as limiting the scope of the present disclosure.

The hood H is preferably a butterfly hood having four main components: a top right panel 14, a top left panel 16, a right side panel (not shown), and a left side panel 18. The top right panel 14 is pivotally mounted to a right mounting portion 20 through a right hinge 24, and the top left panel 16 is pivotally mounted to a left mounting portion 22 through a left hinge 26. The top right panel 14 may pivot upwards on the right hinge 24 and the top left panel 16 may pivot upwards on the left hinge 26 to move each portion of the hood H between open and closed positions.

The hood H is fixedly coupled to a portion of the vehicle V at its forward end, such as the grill assembly G in any suitable, well-known manner. The hood H is adjustably coupled to the cab C near the rear portion of the hood H through the hood mount assembly 10. The hood mount assembly 10 is disposed between a portion of the cab C, such as a cab structure S, and the right and left mounting portions 20 and 22 of the hood H.

Figure 2:
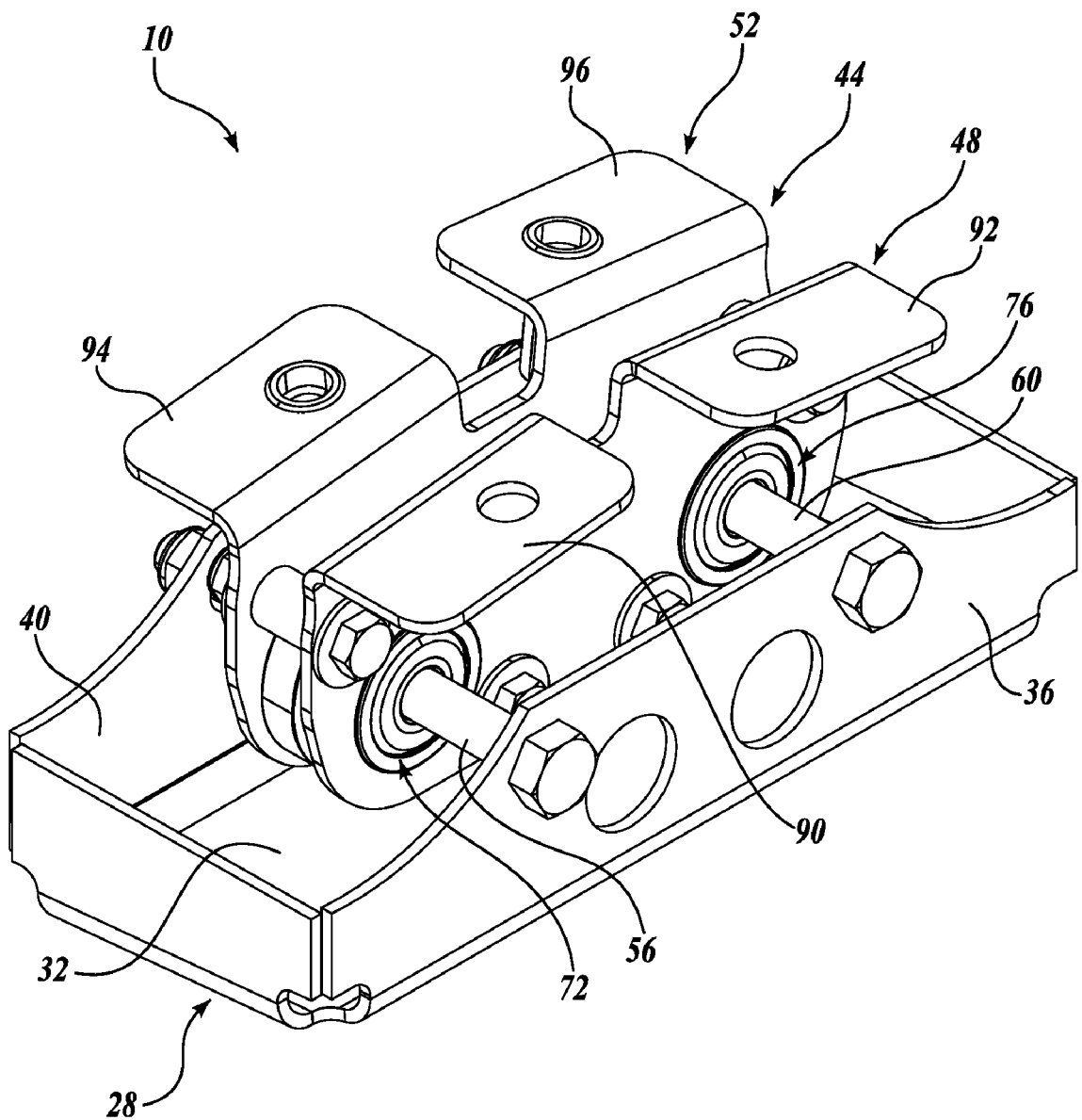
FIG. 2 is an isometric view of the hood mount assembly of FIG. 1.
Figure 3:
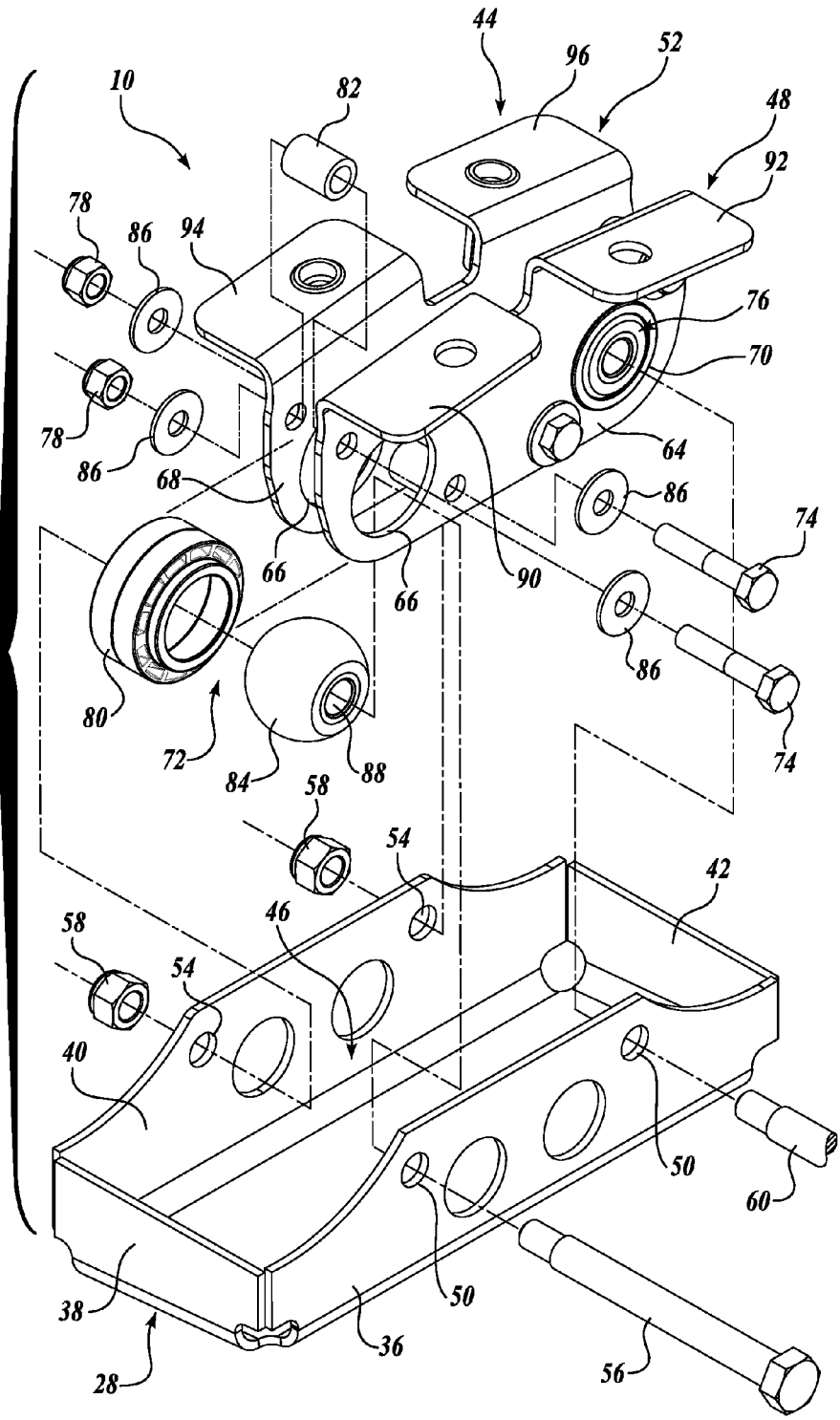
FIG. 3 is an exploded view of the hood mount assembly of FIG. 1.

Referring to FIGS. 2 and 3, the hood mount assembly 10 will now be described in greater detail. The hood mount assembly 10 includes a housing 28 having a base or cab mounting portion 32 that is adapted to be mounted to the cab structure S in any suitable manner, such as with a plurality of fasteners and dampers. The housing 28 includes front and rear edges 36 and 40 extending perpendicularly upwardly from the cab mounting portion 32 in a substantially parallel manner relative to one another. The base 28 further includes first and second side edges 38 and 42 that extend perpendicularly upwardly from the cab mounting portion 32 in a substantially parallel manner relative to one another. The front and rear edges 36 and 40 are positioned substantially perpendicularly to the first and second side edges 38 and 42 to define a substantially square or rectangular housing receptacle 46 for receiving a slider assembly 44 therein. It should be appreciated that the housing 28 may instead be any other suitable shape that is adapted to receive the slider assembly 44 therein.

The slider assembly 44 is disposed within the housing receptacle 46 and is configured to allow the cab C to slide in fore and aft directions relative to the hood H. The slider assembly 44 includes a bracket assembly having first and second slider brackets 48 and 52 positioned vertically, or edgewise within the housing receptacle 46. The first slider bracket 48 includes a first, substantially vertical, slider mounting portion 64 and first and second front flanges 90 and 92 that extend perpendicularly outward in a forward direction from the first slider mounting portion 64. The second slider mounting bracket 52 includes a second substantially vertical slider mounting portion 68 and first and second rear flanges 94 and 96 that extend perpendicularly outward in a rearward direction from the second slider mounting portion 68.

The first and second slider brackets 48 and 52 are positioned within the housing receptacle 46 such that the first and second slider mounting portions 64 and 68 are substantially parallel to one another and substantially parallel to the front and rear edges 36 and 40 of the housing 28. The first and second slider mounting portions 64 and 68 are secured together in any well know manner, such as with a plurality of fasteners. More specifically, a plurality of bolts 72 pass through openings formed in the first and second slider mounting portions 64 and 68 and thereafter receive a nut 78 on the end to secure the first and second slider mounting portions 64 and 68 together. A sleeve is received on the bolt 72 after passing the bolt 72 through one of the first and second slider mounting portions 64 and 68 to separate the first and second slider mounting portions 64 and 68 and define a predetermined gap therebetween. Washers 86 may be used as needed when securing the first and second slider mounting portions 64 and 68 together with the bolt 72 and nut 78 assembly.

The slider assembly 44 further includes first and second bearing or bushing assemblies 72 and 76 disposed between the first and second slider brackets 48 and 52. The first bushing assembly 72 is received within first openings 66 formed in each slider mounting portion 64 and 68. The second bushing assembly 76 is received within second openings 70 formed in each slider mounting portion 64 and 68. The first and second bushing assemblies 72 and 76 each include a bushing housing 80 that rotatably receives a spherical bushing 84. Each spherical bushing 84 includes a through hole that receives a cylindrical bushing 88.

The slider assembly 44 includes first and second shafts 56 and 60 that pass through the first and second bushing assemblies 72 and 76 and openings in the front and rear edges 36 and 40 of the housing 28 to secure the first and second slider brackets 48 and 52 within the housing 28. The first and second shafts 56 and 60 pass through first openings 50 in the front edge 36 of the housing 28, through the cylindrical bushing 88 of the first and second bushing assemblies 72 and 76, and thereafter through second openings 54 in the rear edge 40 of the housing 28. The first and second bushing assemblies 72 and 76 and the first and second openings 50 and 54 in the front and rear edges 36 and 40 of the housing 28 are substantially horizontally aligned such that the first and second shafts 56 and 60 are positioned substantially parallel to one another and substantially parallel to the cab mounting portion 32 of the housing 28 when received therein.

The first and second shafts 56 and 60 may be defined by a hex bolt or any other suitable shaft or fastener that is receivable within the cylindrical bushing 88 of the first and second bushing assemblies 72 and 76 and securable within the front and rear edges 36 and 40 of the housing 28. If a hex bolt is used, a nut 58 is threaded onto the end of the hex bolt to secure the bolt within the housing 28. The portion of the bolts, or shafts 56 and 60, extending between the first and second transverse edges 36 and 40 of the housing 28 is non-threaded such that the shafts 56 and 60 are slidably received within the cylindrical housing 88 of the first and second bushing assemblies 72 and 76.

The first and second shafts 56 and 60 are also rotatable within the bushing housings 80 through the spherical bushings 84. With the first and second bushing assemblies 72 and 76 secured between the first and second slider brackets 48 and 52, the first and second shafts 56 and 60 rotate within the bushing housings 80 about an axis extending between the first and second shafts 56 and 60. More specifically, the first and second shafts 56 and 60 rotate about an axis parallel to the first and second slider mounting portions 64 and 68 of the first and second slider brackets 48 and 52. With the first and second slider mounting portions 64 and 68 secured together, the rotation of the shafts 56 and 60 is substantially limited to one axis of rotation that is perpendicular to the longitudinal axes of the first and second shafts 56 and 60. Moreover, the axis of rotation is defined by the location of the first and second bushing assemblies 72 and 76 on the first and second shafts 56 and 60. It should be appreciated that the first and second slider mounting portions 64 and 68 may instead be adjustably secured together if more than one axis of rotation is desired.

The hood mount assembly 10 is securable to the underside of the hood H through the flanges formed on the first and second slider brackets 48 and 52, as shown in FIGS. 4-8. More specifically, the first front flange 90 and the first rear flange 94 mount to the underside of the right mounting portion 20 of the hood H, and the second front flange 92 and the second rear flange 96 mount to the underside of the left mounting portion 22 of the hood H. The flanges 90, 92, 94, and 96 may be secured to the underside of the hood H in any suitable manner, such as with a plurality of fasteners. It should be appreciated that any other suitable mounting assembly may instead be used.

Figure 4:
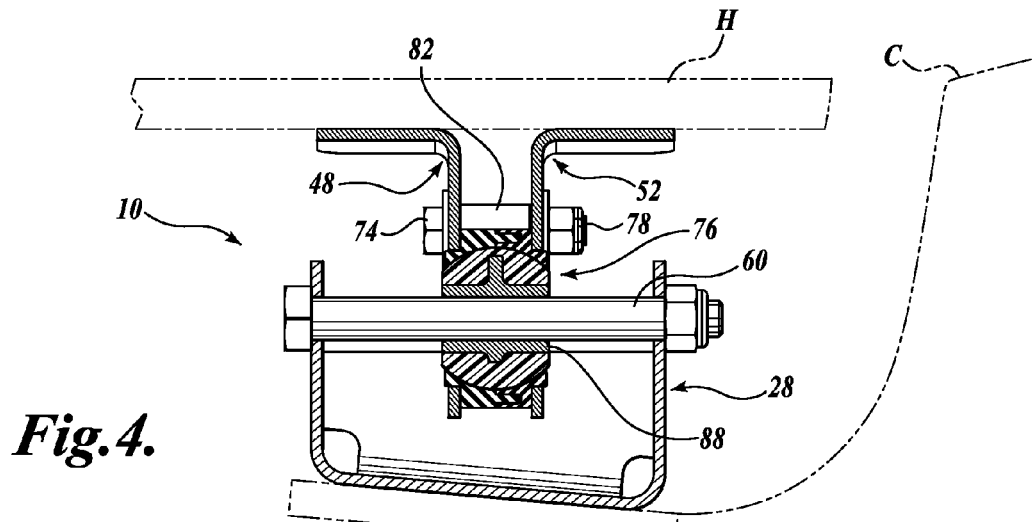
FIG. 4 is a sectional view of the hood mount assembly of FIG. 1 shown in a first position.

Referring to FIGS. 4-8, the hood mount assembly 10 allows the cab C to move independently of the hood H when the cab C responds to road conditions, such as bumps, pot holes, etc. This may occur when the cab suspension system allows the cab to respond to road conditions in a manner different than the hood. FIG. 4 depicts the hood mount assembly 10 in a neutral position with the cab C likewise in a neutral position relative to the hood H. In the neutral position, the first and second bushing assemblies 72 and 76 are approximately centered on the first and second shafts 56 and 60 to accommodate movement of the cab C in both the fore and aft directions.

Figure 5:
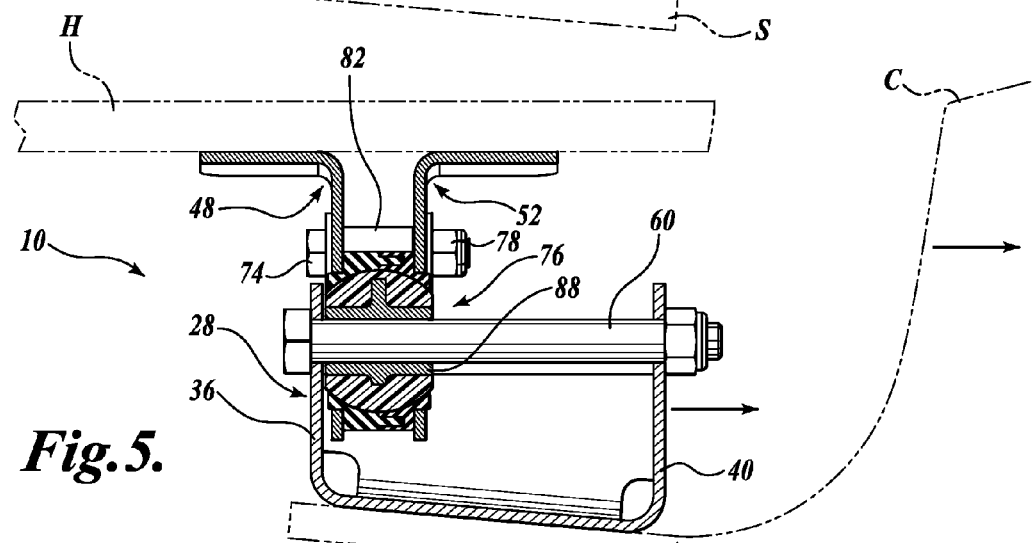
FIG. 5 is a sectional view of the hood mount assembly of FIG. 1 shown in a second position.
Figure 6:
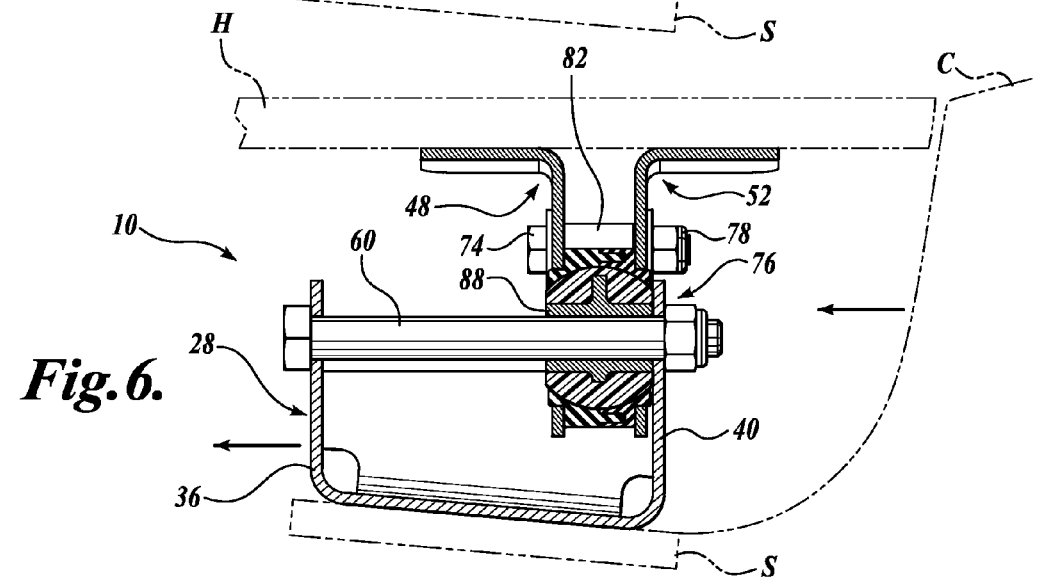
FIG. 6 is a sectional view of the hood mount assembly of FIG. 1 shown in a third position.

Referring to FIGS. 5 and 6, the hood mount assembly 10 allows the cab C to slide in the fore and aft directions relative to the hood H while remaining secured to the hood H. As shown in FIG. 5, when the cab C moves in the aft direction (i.e. away from the hood H), the cab structure S moves with the cab C. The cab structure S pulls the housing 28 and shafts 56 and 60 in the aft direction, and the first and second shafts 56 and 60 slide within the bushing assemblies 72 and 76. The housing 28 and shafts 56 and 60 are able to slide until the front edge 36 of the housing 28 engages the first slider bracket 48. In other words, the cab movement is limited by the length of the shafts 56 and 60. Thus, the cab C, although capable of moving independently of the hood H is somewhat restricted in its linear movement, thus maintaining the structural integrity of the vehicle V.

Referring to FIG. 6, the housing 28 and shafts 56 and 60 move in the forward direction when the cab C moves in the forward direction (i.e. toward the hood H). The first and second shafts 56 and 60 slide within the bushing assemblies 72 and 76, and the housing 28 and first and second shafts 56 and 60 move with the cab structure S to follow the cab C in the forward direction. The housing 28 and shafts 56 and 60 are able to slide until the rear edge 40 of the housing 28 engages the second slider bracket 52.

Figure 7:
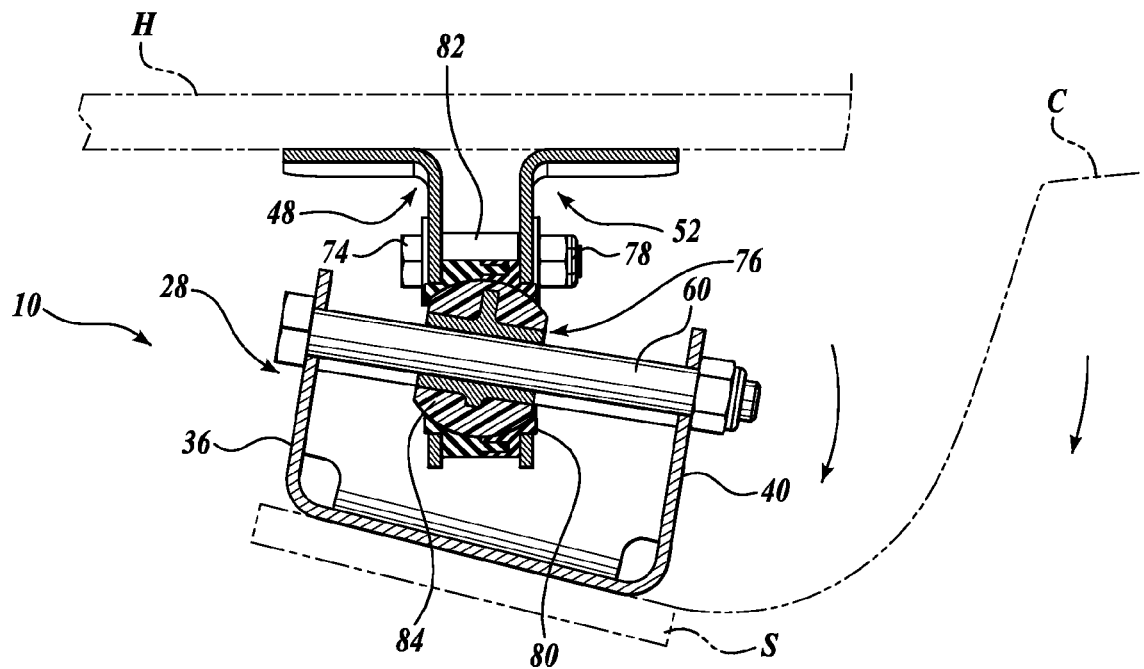
FIG. 7 is a sectional view of the hood mount assembly of FIG. 1 shown in a fourth position.
Figure 8:
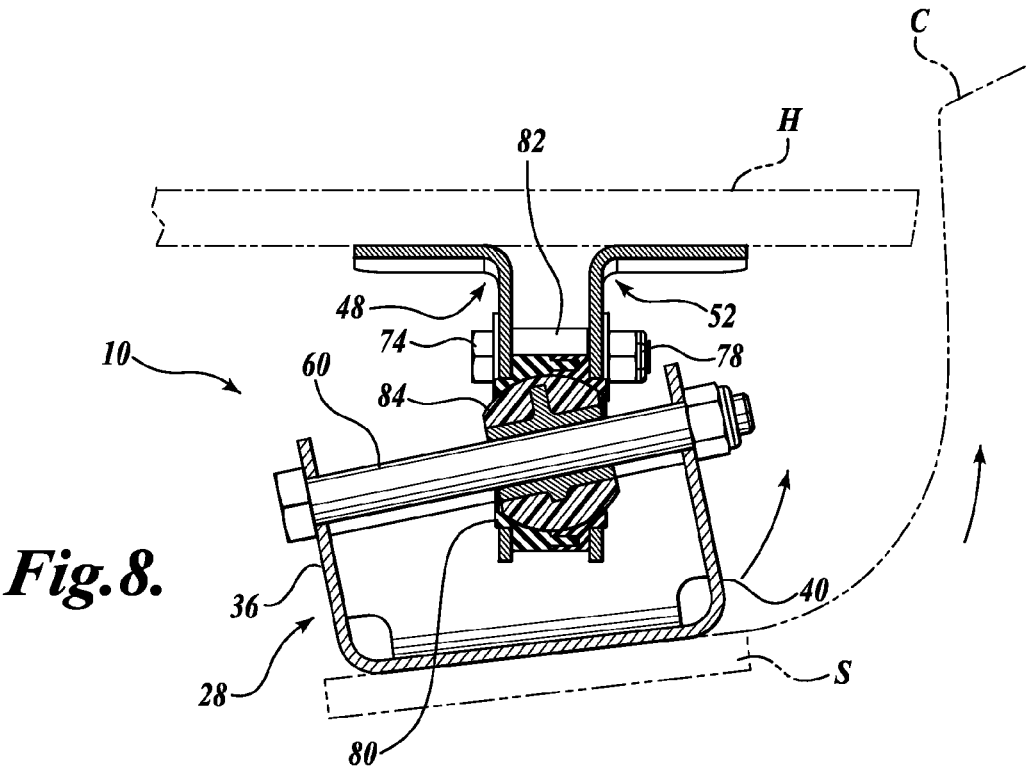
FIG. 8 is a sectional view of the hood mount assembly of FIG. 1 shown in a fifth position.

Referring to FIGS. 7 and 8, the hood mount assembly 10 also accommodates any change in angle between the cab C and the hood H. As shown in FIG. 7, when the cab C moves in a generally clockwise direction, the cab structure S moves with the cab C and causes the housing 28 and the first and second shafts 56 and 60 to move clockwise. The first and second shafts 56 and 60 rotate with the spherical bushings 84 within the bushing housings 80 to accommodate the movement of the housing 28 and cab structure S in the clockwise direction. The axis of rotation of the shafts 56 and 60, the housing 28, and the cab C is defined by the location of the bushing assemblies 72 and 76 on the shafts 56 and 60. Thus, the axis of rotation changes when the cab C moves in the fore or aft direction. Moreover, the movement of the cab C is limited to rotation in the clockwise direction about an axis substantially perpendicular to the longitudinal axes of the first and second shafts 56 and 60, thereby preventing substantial lateral movement of the cab C relative to the hood H.

Referring to FIG. 8, the cab C may similarly move in a generally counterclockwise direction independent of the hood H. When the cab C moves counterclockwise, the cab structure S moves with the cab C and causes the housing 28 and the first and second shafts 56 and 60 to move counterclockwise. The first and second shafts 56 and 60 rotate with the spherical bushings 84 within the bushing housings 80 to accommodate the movement of the housing 28 and cab structure S in the counterclockwise direction. Thus, the cab C can rotate counterclockwise independently of the hood H.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A vehicle, comprising:
   (a) a chassis;
   (b) a cab mounted to the chassis;
   (c) a hood positioned adjacent the cab; and
   (d) a hood mount assembly disposed between the cab and the hood, wherein the hood mount assembly allows the cab to slide in first and second directions relative to the hood and rotate in first and second directions relative to the hood; wherein the hood mount assembly comprises:
      (i) a housing mounted to the cab;
      (ii) a bracket assembly slidably disposed within the housing, the bracket assembly mounted to the hood, wherein the bracket assembly is defined by first and second slider brackets coupled together,
      (iii) first and second bearing assemblies disposed between the first and second slider brackets; and
      (iv) a first shaft slidably and rotatably received within the first bearing assembly and a second shaft slidably and rotatably received within the second bearing assembly, wherein the first and second shafts are fixedly received within the housing.

2. The vehicle of claim 1, wherein the first shaft defines a first longitudinal shaft axis and the second shaft defines a second longitudinal shaft axis.

3. The vehicle of claim 2, wherein the first and second bearing assemblies allow rotation of the first and second shafts about a bearing axis substantially perpendicular to the first and second shaft axes.

4. The vehicle of claim 1, wherein the bracket assembly slides along the first and second shafts to allow the cab to slide in a first direction towards the hood and in a second direction away from the hood.

5. A hood mount assembly for a vehicle having a hood and a cab, the assembly comprising:
   (a) a housing mountable to a portion of the cab;
   (b) a bracket assembly disposed within the housing, the bracket assembly mountable to a portion of the hood, wherein the bracket assembly is defined by first and second slider brackets coupled together;
   (c) first and second bearing assemblies disposed within the bracket assembly, wherein the first and second bearing assemblies are disposed between the first and second slider brackets
   (d) first and second shafts received within the housing, wherein the first shaft is slidably and rotatably received within the first bearing assembly and the second shaft is slidably and rotatably received within the second bearing assembly.

6. The hood mount assembly of claim 5, wherein the first shaft defines a first longitudinal shaft axis and the second shaft defines a second longitudinal shaft axis.

7. The hood mount assembly of claim 6, wherein the first and second bearing assemblies allow rotation of the first and second shafts about a bearing axis transverse to the first and second longitudinal shaft axes.

8. The hood mount assembly of claim 5, wherein the bracket assembly slides along the first and second shafts to allow the cab to slide in a first direction towards the hood and in a second direction away from the hood.

9. A hood mount assembly for a vehicle having a hood and a cab, the assembly comprising:
   (a) a housing mountable to a portion of the cab;
   (b) a bracket assembly disposed within the housing, the bracket assembly mountable to a portion of the hood;
   (c) first and second bearing assemblies disposed within the bracket assembly; and
   (d) first and second shafts received within the housing, wherein the first shaft defines a first longitudinal shaft axis and the second shaft defines a second longitudinal shaft axis, wherein the first shaft is slidably received within the first bearing assembly and the second shaft is slidably received within the second bearing assembly, and wherein the first and second shafts are rotatably received within the first and second bearing assemblies such that the shafts are movable about a bearing axis substantially transverse to the first and second longitudinal shaft axes.

10. The hood mount assembly of claim 9, wherein the bracket assembly is defined by first and second slider brackets coupled together.

11. The hood mount assembly of claim 10, wherein the first and second bearing assemblies are disposed between the first and second slider brackets.

12. The hood mount assembly of claim 9, wherein the bracket assembly slides along the first and second shafts to allow the cab to slide in a first direction towards the hood and in a second direction away from the hood.

13. The hood mount assembly of claim 9, wherein the housing includes first and second opposing edges, and wherein the first and second shafts extend between the first and second opposing edges such that the first edge limits movement of the cab in a first direction relative to the hood and the second edge limits movement of the cab in a second direction relative to the hood.

14. The hood mount assembly of claim 9, wherein the bracket assembly comprises a first opening through which the first shaft passes and a second opening through which the second shaft passes, wherein the first and second openings are in fixed relation to one another such that the bracket assembly is movable in one rotational degree of freedom and one translational degree of freedom relative to the first and second shafts.

* * * * *

UNITED STATES PATENT AND TRADEMARK OFFICE
CERTIFICATE OF CORRECTION

| | | |
|---|---|---|
| PATENT NO. | : 7,770,680 B2 | Page 1 of 1 |
| APPLICATION NO. | : 11/967927 | |
| DATED | : August 10, 2010 | |
| INVENTOR(S) | : H. S. Chen et al. | |

It is certified that error appears in the above-identified patent and that said Letters Patent is hereby corrected as shown below:

| COLUMN | LINE | ERROR |
|---|---|---|
| (74) Title Page col. 2 | Attorney, Agent, or Firm line 1) | "Christensen O'Connor;" should read --Christensen O'Connor-- |
| 6 (Claim 5, | 4 line 11) | "slider brackets" should read --slider brackets; and-- |

Signed and Sealed this
First Day of February, 2011

David J. Kappos
*Director of the United States Patent and Trademark Office*